United States Patent
Murphy et al.

(10) Patent No.: US 8,342,867 B2
(45) Date of Patent: Jan. 1, 2013

(54) FREE FLOATING CONNECTOR ENGAGEMENT AND RETENTION SYSTEM AND METHOD FOR ESTABLISHING A TEMPORARY ELECTRICAL CONNECTION

(75) Inventors: Timothy A. Murphy, Tucson, AZ (US); Timothy R. Werch, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 296 days.

(21) Appl. No.: 12/787,745

(22) Filed: May 26, 2010

(65) Prior Publication Data
US 2012/0108094 A1    May 3, 2012

Related U.S. Application Data

(60) Provisional application No. 61/265,555, filed on Dec. 1, 2009.

(51) Int. Cl.
*H01R 13/64* (2006.01)
(52) U.S. Cl. ...................................................... 439/248
(58) Field of Classification Search .................. 439/248, 439/247, 378
See application file for complete search history.

(56) References Cited

U.S. PATENT DOCUMENTS

| | | | |
|---|---|---|---|
| 4,412,475 A | 11/1983 | Hornby | |
| 5,092,774 A * | 3/1992 | Milan | 439/66 |
| 5,651,683 A * | 7/1997 | Shimamura et al. | 439/34 |
| 6,466,044 B1 * | 10/2002 | Smith | 324/750.25 |
| 6,851,647 B1 | 2/2005 | Rosenbaum et al. | |
| 7,059,882 B2 * | 6/2006 | Sugita et al. | 439/247 |
| 7,232,092 B2 | 6/2007 | Yamamoto | |
| 2007/0025809 A1 | 2/2007 | Lee et al. | |
| 2008/0203220 A1 | 8/2008 | Hanzlick et al. | |
| 2008/0270664 A1 | 10/2008 | Carnevali | |

FOREIGN PATENT DOCUMENTS
WO    WO-2011068536    6/2011

OTHER PUBLICATIONS

"International Application Serial No. PCT/US2010/003073, Search Report mailed Mar. 1, 2011", 2 pgs.
"International Application Serial No. PCT/US2010/003073, Written Opinion mailed Mar. 1, 2011", 9 pgs.
"International Application Serial No. PCT/US2010/003073, International Preliminary Report on Patentability mailed Jun. 14, 2012", 7 pgs.

\* cited by examiner

*Primary Examiner* — Tulsidas C Patel
*Assistant Examiner* — Phuongchi Nguyen
(74) *Attorney, Agent, or Firm* — Schwegman Lundberg & Woessner, P.A.

(57) ABSTRACT

Embodiments of a free-floating connector engagement and retention system are provided. In some embodiments, the system includes a slotted mounting surface, a connector carrier guide, and a connector carrier to receive a connector. The connector carrier may have two threaded holes therein. The connector carrier may be positioned between the connector carrier guide and the slotted mounting surface and may be retained by a set of threaded spring pins that pass through the threaded holes in the connector carrier. The ends of the threaded spring pins may be retained in the slots of the carrier guide and the necks of the threaded spring pins may be retained in slots of the slotted mounting surface. The connector and the connector carrier are free to move within the limits set by the slots of the slotted mounting surface and the slots of the carrier guide.

18 Claims, 2 Drawing Sheets

FREE FLOATING CONNECTOR ENGAGEMENT AND RETENTION SYSTEM AND METHOD FOR ESTABLISHING A TEMPORARY ELECTRICAL CONNECTION

PRIORITY CLAIM

This patent application claims the benefit of priority under 35 U.S.C. 119 to U.S. Provisional Patent Application Ser. No. 61/265,555 filed Dec. 1, 2009, entitled "FREE FLOATING CONNECTOR ENGAGEMENT AND RETENTION SYSTEM AND METHOD".

TECHNICAL FIELD

Embodiments pertain to systems for establishing a temporary electromechanical connection between two independent bodies. Some embodiments pertain to connector engagement and retention systems. Some embodiments relate to systems for connecting small munitions to a launcher. Some embodiments relate to systems for connecting electrical equipment to an unmanned aerial vehicle (UAV).

BACKGROUND

Temporary electrical connections, such as an umbilical type connection, are established between two electrical devices prior to separation of the devices. For example, a temporary electrical connection may be established between a small munition and a launcher before launch. A temporary electrical connection may also be established between a UAV and on-board test equipment to allow the on-board test equipment to be easily replaced in the field.

There are a number of issues with making these temporary electromechanical connections. One issue relates to the stringent alignment requirements on one or both sides of the connection. Another issue is the risk associated with accidental disengagement. Another issue is the stress derived from misalignment. Another issue is the possibility of connector pullout from the parent assembly when separation occurs.

Thus what are needed are a connector engagement and retention system and method of providing a temporary electromechanical connection that addresses one or more of these issues.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In some embodiments, a free-floating connector engagement and retention system is provided. These embodiments address a number of issues when making a temporary electromechanical connection, such as an umbilical type connection, between two independent bodies. In some embodiments, stringent alignment requirements may be reduced or eliminated on one or both sides of the connection. In some embodiments, a connector is retained in such a way as to reduce or eliminate the possibility of accidental disengagement. In some embodiments, stresses derived from misalignment are reduced or even eliminated. In some embodiments, a connector is restrained in a manner that reduces or eliminates the possibility of connector pullout from the parent assembly when separation occurs.

In some embodiments, a free-floating connector engagement and retention system is provided that includes three main parts that can be scaled and/or modified for each specific application. A connector is mounted in a connector carrier, which has two threaded through holes in it. A connector carrier is mounted between a connector carrier guide and a slotted mounting surface and is retained in place by a set of threaded spring pins that pass through the threaded holes in the carrier. The ends of the pins are retained in the slots on the carrier guide and the necks of the pins are retained in the slots in the mounting surface. These features allow the connector to simultaneously move up and down and fore and aft within the limits set by the slots. Additionally, some axial roll may be obtained based on the thickness of the carrier in relationship to the gap created by the mounting surface and the carrier guide.

Figure 1:
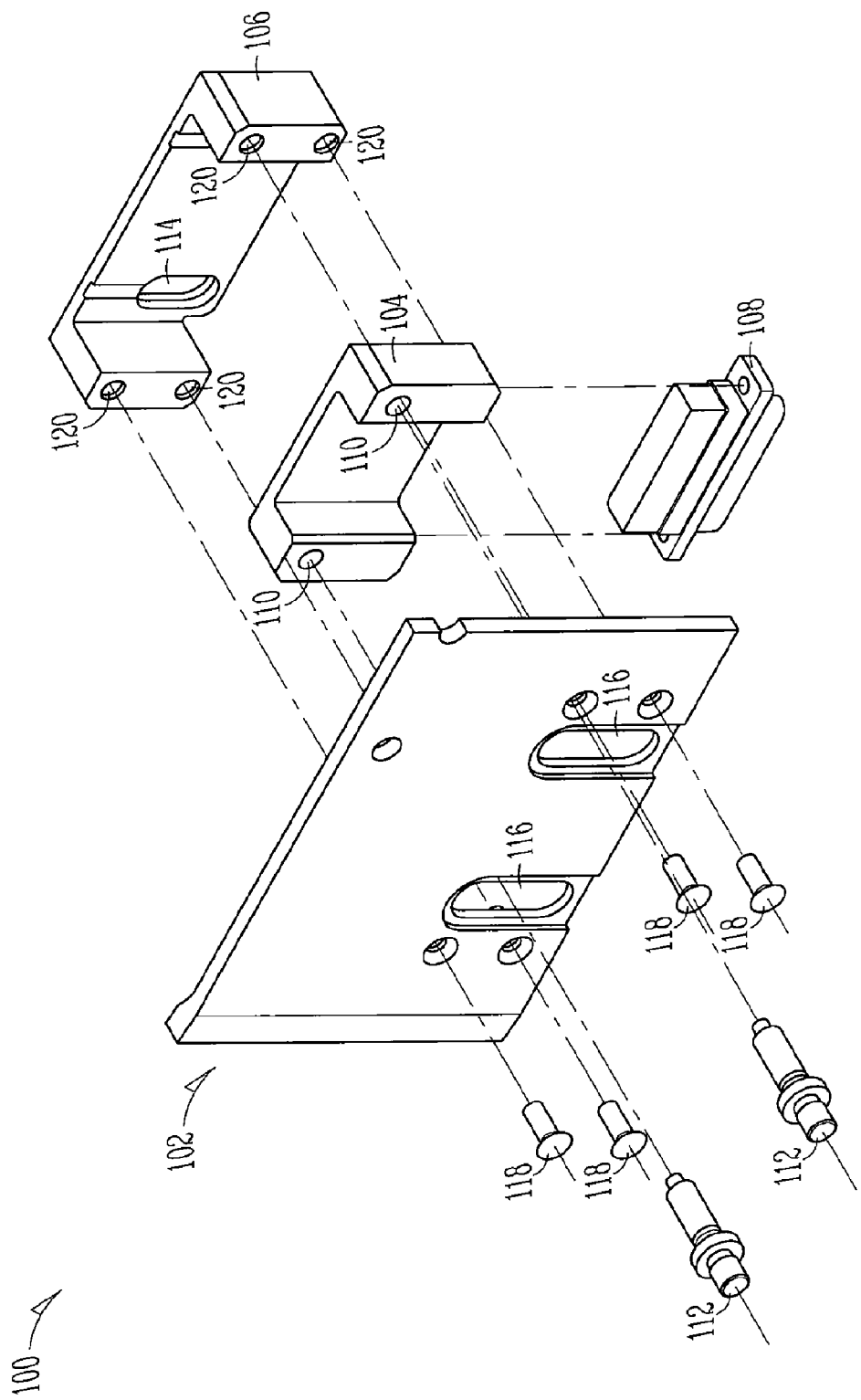
FIG. 1 illustrates a free-floating connector engagement and retention system, in accordance with some embodiments.

FIG. 1 illustrates a free-floating connector engagement and retention system 100 in accordance with some embodiments. In some embodiments, the free-floating connector engagement and retention system 100 includes a slotted mounting surface 102, a connector carrier guide 106, and a connector carrier 104 to receive a connector 108. The connector carrier 104 may have two threaded holes 110 therein. The connector carrier 104 may be positioned between the connector carrier guide 106 and the slotted mounting surface 102 and may be retained by a set of threaded spring pins 112 that pass through the threaded holes 110 in the connector carrier 104. The ends of the threaded spring pins 112 may be retained in the slots 114 of the carrier guide 106 and the necks of the threaded spring pins 112 may be retained in slots 116 of the slotted mounting surface 102. The connector 108 and the connector carrier 104 are free to move within the limits set by the slots 116 of the slotted mounting surface 102 and the slots 114 of the carrier guide 106. The carrier guide 106 may have threaded holes 120. Screws 118 may be used to fasten the slotted mounting surface 102 to the carrier guide 106.

Figure 2A:
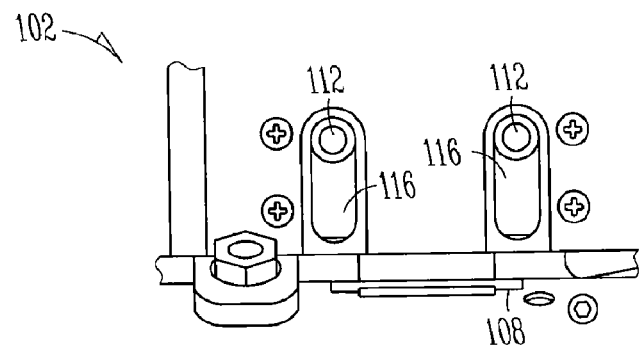
FIG. 2A illustrates a connector in a stowed position, in accordance with some embodiments.
Figure 2B:
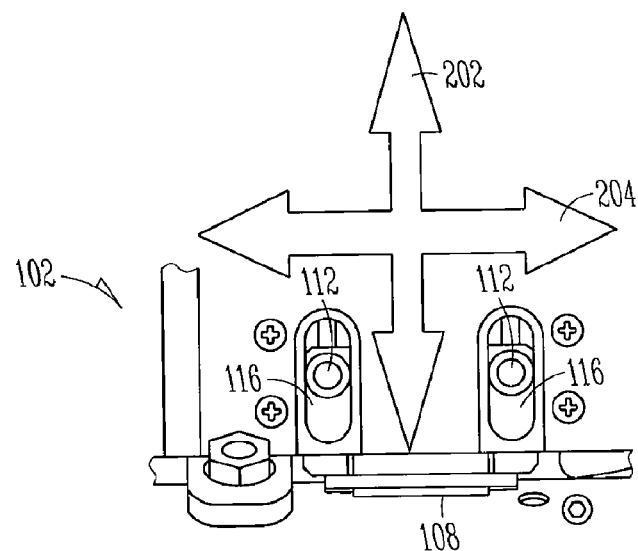
FIG. 2B illustrates the connector engaged and free to travel with its mate, in accordance with some embodiments.
Figure 2C:
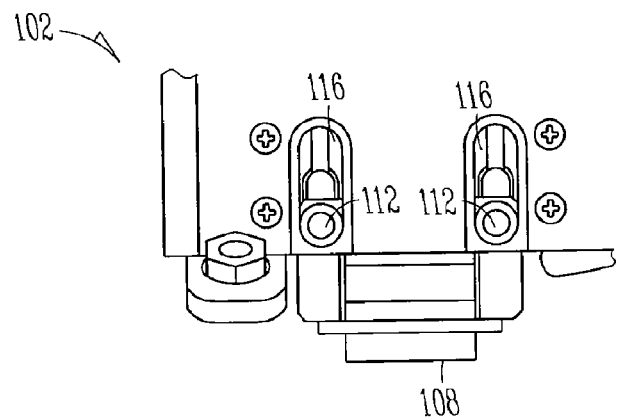
FIG. 2C illustrates the connector disengaged and retained by slots, in accordance with some embodiments.

The free-floating connector engagement and retention system 100 may be suitable for use in connecting a small munition to a launcher. In various embodiments, the free-floating connector engagement and retention system 100 is small, compact, lightweight, and low cost, is easy to operate and has few moving parts. The free-floating connector engagement and retention system 100 is also adaptable to different connector sizes and different connector types FIGS. 2A, 2B and 2C illustrate various operational features of the free-floating connector engagement and retention system 100 (FIG. 1), in accordance with some embodiments. As illustrated, the necks of the threaded spring pins 112 may be retained in slots 116 of the slotted mounting surface 102. The threaded spring pins 112 provide for at least three additional functions in the system. In some embodiments, the threaded spring pins 112 allow the connector carrier 104 (FIG. 1) to be stowed in a disengaged position by fully retracting threaded spring pins 112 and pushing the connector carrier 104 up beyond the connector carrier guide slots. FIG. 2A illustrates the connector 108 in the stowed position, in accordance with some embodiments. Once a connection has been made, the threaded spring pins 112 may help keep the connector 108 from disengaging from its mate by limiting upward movement.

FIG. 2B illustrates the connector engaged and free to travel with its mate, in accordance with some embodiments. The connector 108 and the connector carrier 104 (FIG. 1) are free to move up and down 202 and fore and aft 204 within limits set by the slots 116 of the slotted mounting surface 102 and the slots 114 (FIG. 1) of the carrier guide 106 (FIG. 1). The threaded spring pins 112 may also aid with separation by acting as a hard stop against the slots 114 and 116 when the connector carrier 104 has reached the end of travel. FIG. 2C illustrates the connector 108 disengaged and retained by slots 116 of the slotted mounting surface 102, in accordance with some embodiments.

In some embodiments, the free-floating connector engagement and retention system 100 (FIG. 1) may be used in a small tactical munition launcher, although this is not a requirement. One issue with the use of a conventional card edge connector in small munitions is that any required float in the connection may cause intermittent opens in the electrical connection and may leave the connection exposed to the environment causing a potential for electrical shorting. Another issue with the use of a conventional card edge connector in small munitions is that the connection may have to be made as the device is being attached to the launcher resulting in the possibility of connector damage due to misalignment.

Embodiments of the free-floating connector engagement and retention system 100 may be applicable to any application where there can be movement between two mated connectors. Some embodiments may be applicable to future unmanned aerial vehicles (UAVs) to connect to the aircraft since the engagement and retention system 100 is light weight, compact, and low cost. Some embodiments may be applicable to UAV aircraft to allow on-board test equipment to be easily replaced in the field. Some embodiments may be applicable to test station connections in missile hardware, including use during vibration testing on production programs. Embodiments of the free-floating connector engagement and retention system 100 are also easily adapted to other connector shapes.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A free-floating connector engagement and retention system comprising:
    a slotted mounting surface including elongate mounting surface slots therein;
    a connector carrier guide including elongate carrier guide slots therein; and
    a connector carrier to receive a connector, the connector carrier having threaded holes therein, and the elongate mounting surface slots and the elongate carrier guide slots extend transversely relative to the threaded holes;
    wherein the connector carrier is positioned between the connector carrier guide and the slotted mounting surface and is retained by a set of threaded spring pins that pass through the threaded holes in the connector carrier and the elongate mounting surface slots and the elongate carrier guide slots, and
    the threaded pins and the connector carrier are laterally moveable along the elongate mounting surface slots and the elongate carrier guide slots in one or more directions transverse to the threaded holes, and
    lateral movement of the threaded pins and the connector carrier is constrained according to the elongate mounting surface slots and elongate carrier guide slots.

2. The system of claim 1, wherein the threaded spring pins are configured to aid with separation of the connector by acting as hard stops against the slots when the connector carrier has reached an end of travel.

3. The system of claim 1, wherein ends of the threaded spring pins are retained in the elongate carrier guide slots of the connector carrier guide and necks of the threaded spring pins are retained in the elongate mounting surface slots of the slotted mounting surface.

4. The system of claim 3, wherein the connector and the connector carrier are free to move within limits set by the elongated mounting surface slots of the slotted mounting surface and the elongated carrier guide slots of the carrier guide.

5. A method of providing a temporary electromechanical connection comprising:
    retaining a connector in a connector carrier;
    movably positioning the connector carrier between a connector carrier guide and a slotted mounting surface, the connector carrier slidable along the slotted mounting surface and the connector carrier guide; and
    retaining the connector carrier with a set of threaded spring pins that pass through threaded holes in the connector carrier,
    wherein ends of the threaded spring pins are retained in elongate carrier guide slots of the connector carrier guide and necks of the threaded spring pins are retained in elongate mounting surface slots of the slotted mounting surface, the elongate mounting surface slots and the elongate carrier guide slots extend transversely relative to the threaded holes, and the threaded pins and the connector carrier are laterally moveable along the elongate mounting surface slots and the elongate carrier guide slots in one or more directions transverse to the threaded holes.

6. The method of claim 5, wherein the connector and the connector carrier are free to move within limits set by the elongate mounting surface slots of the slotted mounting surface and the elongate carrier guide slots of the carrier guide.

7. The method of claim 6, wherein the connector is part of a free-floating connector engagement and retention system, and
    wherein the method further comprises connecting a small munition to a launcher with the free-floating connector engagement and retention system to establish a temporary electrical connection.

8. The method of claim 6, wherein the connector is part of a free-floating connector engagement and retention system, and
    wherein the method further comprises connecting unmanned aerial vehicle to on-board test equipment with the free-floating connector engagement and retention system to establish an electrical connection.

9. A free-floating connector engagement and retention system comprising:

a connector carrier movably positioned between a connector carrier guide and a slotted mounting surface retained by a set of threaded spring pins that pass through threaded holes in the connector carrier, the connector carrier is to receive a connector, and at least the connector carrier is slidable along the connector carrier guide and the slotted mounting surface transversely relative to a threaded spring pin longitudinal axis;

wherein the connector carrier guide includes elongate carrier guide slots with the threaded spring pins received therein, and the threaded spring pins are transversely slidable along the elongate carrier guide slots relative to the threaded spring pin longitudinal axis; and wherein the slotted mounting surface includes elongate mounting surface slots with the threaded spring pins received therein, and the threaded spring pins are transversely slidable along the elongate mounting surface slots relative to the threaded spring pin longitudinal axis.

10. The system of claim 9, wherein ends of the threaded spring pins are retained in the elongate carrier guide slots of the connector carrier guide and necks of the threaded spring pins are retained in the elongate mounting surface slots of the slotted mounting surface.

11. The system of claim 10, wherein the connector and the connector carrier are free to move up and down and fore and aft within limits set by the elongate mounting surface slots of the slotted mounting surface and the elongate carrier guide slots of the connector carrier guide.

12. The system of claim 11, wherein the threaded spring pins aid with separation of the connector by acting as hard stops against the slots when the connector carrier has reached an end of travel.

13. A system for establishing a temporary electrical connection with a multi-pin connector to allow movement between mated connectors, the system comprising:

a slotted mounting surface;

a connector carrier guide; and a connector carrier to receive the multi-pin connector, the connector carrier having threaded holes therein, wherein the connector carrier is positioned between the connector carrier guide and the slotted mounting surface, and the connector carrier is movable relative to the connector carrier guide and the slotted mounting surface transverse relative to a threaded hole longitudinal axis.

14. The system of claim 13, wherein the connector and the connector carrier are free to transversely move within limits set by elongate slots of the slotted mounting surface and elongate slots of the connector carrier guide, the elongate slots extend transverse to the threaded hole longitudinal axis.

15. The system of claim 14, wherein the connector carrier is retained between the connector carrier guide and the slotted mounting surface by a set of threaded spring pins that pass through the threaded holes in the connector carrier, and wherein ends of the threaded spring pins are slidably retained in the elongate slots of the connector carrier guide and necks of the threaded spring pins are slidably retained in the elongate slots of the slotted mounting surface, the ends and the necks of the threaded spring pins are transversely slidable along the elongate slots and constrained from movement outside of the elongate slots according to a shape of the elongate slots.

16. The system of claim 15, wherein the threaded spring pins are configured to aid with separation of the multi-pin connector by acting as hard stops against the slots when the connector carrier has reached an end of travel.

17. The system of claim 16, wherein the system is configured to connect small munitions to a launcher.

18. The system of claim 16, wherein the system is configured to connect electrical equipment to an unmanned aerial vehicle.

* * * * *